(12) United States Patent
Maki

(10) Patent No.: US 8,750,130 B2
(45) Date of Patent: Jun. 10, 2014

(54) COMMUNICATION APPARATUS HAVING NETWORK COMMUNICATION FUNCTION, CONTROL METHOD FOR THE COMMUNICATION APPARATUS, AND STORAGE MEDIUM

(75) Inventor: Nobuhiko Maki, Tokyo (JP)

(73) Assignee: Canon Kabushiki Kaisha (JP)

( * ) Notice: Subject to any disclaimer, the term of this patent is extended or adjusted under 35 U.S.C. 154(b) by 98 days.

(21) Appl. No.: 13/241,418

(22) Filed: Sep. 23, 2011

(65) Prior Publication Data

US 2012/0087248 A1    Apr. 12, 2012

(30) Foreign Application Priority Data

Oct. 6, 2010    (JP) .................................. 2010-226722

(51) Int. Cl.
*H04L 12/26* (2006.01)

(52) U.S. Cl.
USPC ........... 370/241; 370/236; 370/248; 370/346; 370/395.3

(58) Field of Classification Search
None
See application file for complete search history.

(56) References Cited

U.S. PATENT DOCUMENTS

| | | | | |
|---|---|---|---|---|
| 6,614,763 | B1 * | 9/2003 | Kikuchi et al. | 370/252 |
| 6,738,352 | B1 * | 5/2004 | Yamada et al. | 370/238 |
| 7,613,142 | B2 * | 11/2009 | Molteni et al. | 370/328 |
| 7,826,363 | B2 * | 11/2010 | Dunlap et al. | 370/232 |
| 7,924,721 | B2 * | 4/2011 | Nishikawa et al. | 370/235 |
| 8,077,632 | B2 * | 12/2011 | Samuels et al. | 370/254 |
| 8,358,580 | B2 * | 1/2013 | Ray et al. | 370/230 |
| 2007/0192860 | A1 * | 8/2007 | Hiscock | 726/23 |
| 2009/0185572 | A1 * | 7/2009 | Yasuma | 370/401 |
| 2013/0019317 | A1 * | 1/2013 | Whelan et al. | 726/26 |
| 2013/0097691 | A1 * | 4/2013 | Tanji | 726/13 |
| 2013/0097692 | A1 * | 4/2013 | Cooper et al. | 726/14 |

FOREIGN PATENT DOCUMENTS

| | | |
|---|---|---|
| JP | 2004-266689 A | 9/2004 |
| JP | 2005-286458 A | 10/2005 |
| JP | 2006-201994 A | 8/2006 |
| WO | 2005010770 A1 | 2/2005 |

OTHER PUBLICATIONS

Japanese Office Action for corresponding JP 2010-226722, mail date Apr. 8, 2014.

* cited by examiner

*Primary Examiner* — Andrew Lai
*Assistant Examiner* — Hoyet H Andrews
(74) *Attorney, Agent, or Firm* — Rossi, Kimms & McDowell LLP

(57) ABSTRACT

A communication apparatus having a communication function, which is capable of improving security while ensuring convenience in network communication using the ICMP Echo protocol. It is determined whether or not a source of a received packet is an apparatus lies in the same network as a network in which the communication apparatus is installed. According to the determination result, whether or not to respond to the received packet is judged based on one of a first judgment condition used in a case where the source lies in the same network as the network in which the communication apparatus is installed, and a second judgment condition used in a case where the source does not lie in the same network as the network in which the communication apparatus is installed. According to the judgment result, a response to the received packet is sent back.

7 Claims, 9 Drawing Sheets

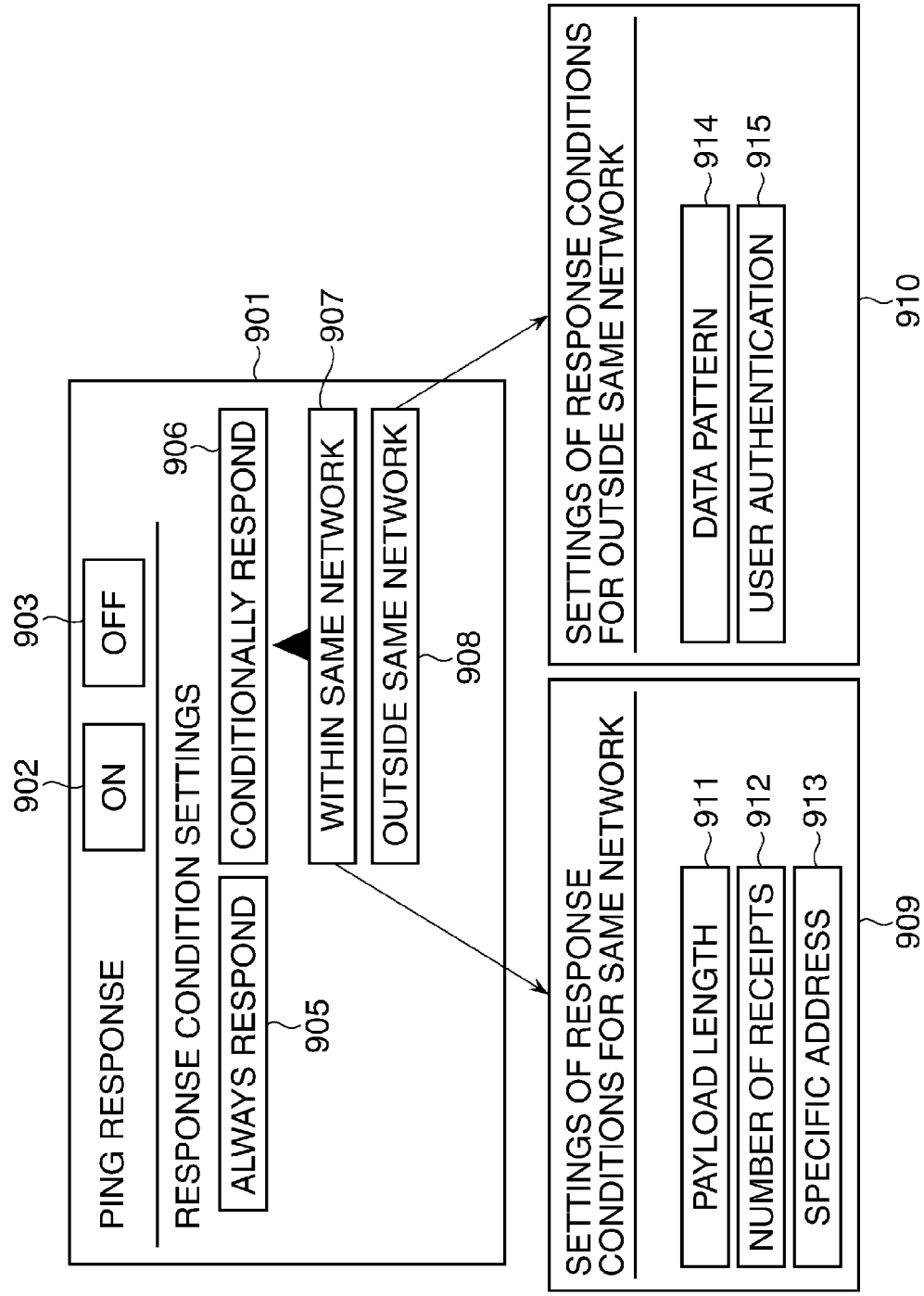

COMMUNICATION APPARATUS HAVING NETWORK COMMUNICATION FUNCTION, CONTROL METHOD FOR THE COMMUNICATION APPARATUS, AND STORAGE MEDIUM

BACKGROUND OF THE INVENTION

1. Field of the Invention

The present invention relates to a communication apparatus having a communication function, a control method for the communication apparatus, and a computer-readable storage medium storing a program for implementing the method, and more particularly to a network security technique for a communication apparatus.

2. Description of the Related Art

Networking equipment installed with the TCP/IP protocol supports the ICMP Echo protocol.

The ICMP Echo protocol is a simple protocol that transmits an ICMP Echo Request packet to networking equipment at a transmission destination, and upon receiving this packet, the networking equipment sends back a response with an ICMP Echo Request packet.

The ICMP Echo protocol is generally used to check if communication with networking equipment at a transmission destination is possible, check if communication paths present any problem, and measure the time for response from networking equipment at a transmission destination, and is used as a means for checking communication status.

Moreover, techniques using the ICMP Echo protocol as instruction commands for networking equipment have been proposed.

For example, a technique that monitoring equipment creates a statistical information header, and an ICMP Echo Request packet including the created statistical information header as a payload of ICMP Echo is transmitted to equipment to be monitored (Japanese Laid-Open Patent Publication (Kokai) No. 2005-286458).

According to this proposal, when the equipment to be monitored which has received the ICMP Echo Request packet determines that a normal statistical information header is stored, a network from which statistical information should be taken out is identified.

Then, the equipment to be monitored obtains statistical information from a storage device, writes the statistical information in a payload of ICMP Echo and sends back the same. Upon determining that normal statistical information is stored in the payload of the sent-back ICMP Echo Reply, the monitoring equipment takes out the statistical information and stores the same in a storage device. Therefore, as compared to cases where SNMP is used, statistical information can be collected from a small-sized device having a small memory capacity at lower cost, and more statistical information can be collected.

However, when the ICMP Echo protocol is used, a malicious third party can confirm the presence of networking equipment by issuing a Ping command or the like from an external network, and hence the ICMP Echo protocol may be undesirable in terms of security for networking equipment.

Moreover, a universal OS has a means for disabling an ICMP Echo Reply to an ICMP Echo Request so as to make it difficult to detect the presence of networking equipment, but when an ICMP Echo Reply to an ICMP Echo Request is disabled, it becomes impossible to check communication status or the like.

SUMMARY OF THE INVENTION

The present invention provides a communication apparatus and a control method for the communication apparatus, which are capable of improving security while ensuring convenience in network communication using the ICMP Echo protocol, as well as a computer-readable storage medium storing a program for implementing the method.

Accordingly, a first aspect of the present invention provides a communication apparatus comprising a receiving unit configured to receive a packet, a determination unit configured to determine whether a source of the packet received by the receiving unit is an apparatus lying in the same network as a network in which the communication apparatus lies, a judgment unit configured to, according to a result of the determination by the determination unit, judge whether to respond to the packet received by the receiving unit based on one of a first judgment condition used in a case where the source lies in the same network as the network in which the communication apparatus lies, and a second judgment condition used in a case where the source does not lie in the same network as the network in which the communication apparatus lies, and a response unit configured to, according to a result of the judgment by the judgment unit, respond to the packet received by the receiving unit.

Accordingly, a second aspect of the present invention provides a control method for a communication apparatus, comprising a receiving step of receiving a packet, a determination step of determining whether a source of the packet received in the receiving step is an apparatus lying in the same network as a network in which the communication apparatus lies, a judgment step of, according to a result of the determination in the determination step, judging whether to respond to the packet received in the receiving step based on one of a first judgment condition used in a case where the source lies in the same network as the network in which the communication apparatus lies, and a second judgment condition used in a case where the source does not lie in the same network as the network in which the communication apparatus lies, and a response step of, according to a result of the judgment in the judgment step, responding to the packet received in the receiving step.

Accordingly, a third aspect of the present invention provides a computer-readable non-transitory storage medium storing a program for implementing a control method for controlling a communication apparatus, the control method comprising a receiving step of receiving a packet, a determination step of determining whether a source of the packet received in the receiving step is an apparatus lying in the same network as a network in which the communication apparatus lies, a judgment step of, according to a result of the determination in the determination step, judging whether to respond to the packet received in the receiving step based on one of a first judgment condition used in a case where the source lies in the same network as the network in which the communication apparatus lies, and a second judgment condition used in a case where the source does not lie in the same network as the network in which the communication apparatus lies, and a response step of, according to a result of the judgment in the judgment step, responding to the packet received in the receiving step.

According to the present invention, security can be improved while convenience in network communication using the ICMP Echo protocol is ensured.

Further features of the present invention will become apparent from the following description of exemplary embodiments (with reference to the attached drawings).

BRIEF DESCRIPTION OF THE DRAWINGS

FIG. 9 is a view showing an exemplary setting screen displayed on a console of the MFP so that a user can set determination conditions used in step S701 in FIG. 7 and step S801 in FIG. 8.

DESCRIPTION OF THE EMBODIMENTS

The present invention will now be described in detail with reference to the drawings showing embodiments thereof.

Figure 1:
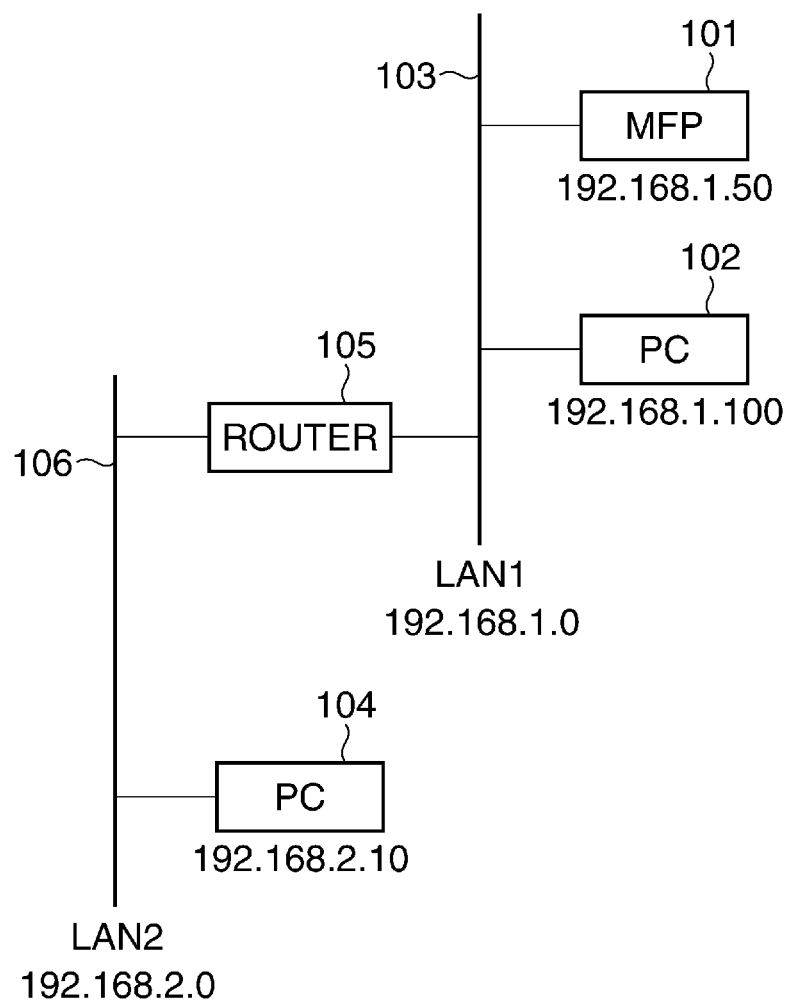
FIG. 1 is a diagram schematically showing an exemplary arrangement of a network including an MFP which is a communication apparatus according to an embodiment of the present invention.

FIG. 1 is a diagram schematically showing an exemplary arrangement of a network including an MFP which is a communication apparatus according to an embodiment of the present invention.

Referring to FIG. 1, the MFP 101 according to the present embodiment has a network communication function of communicating with a PC (personal computer) 102 and a PC 104 via a LAN 103 and a LAN 106, which is connected to the LAN 103 via a router 105. The MFP 101 has an IP address 192.168.1.50, and the PC 102 and the PC 104 have an IP address 192.168.1.100 and an IP address 192.168.2.10, respectively. The PC 102 and the PC 104 are equipped with an application for processing Ping commands as well as a universal OS.

Figure 2:
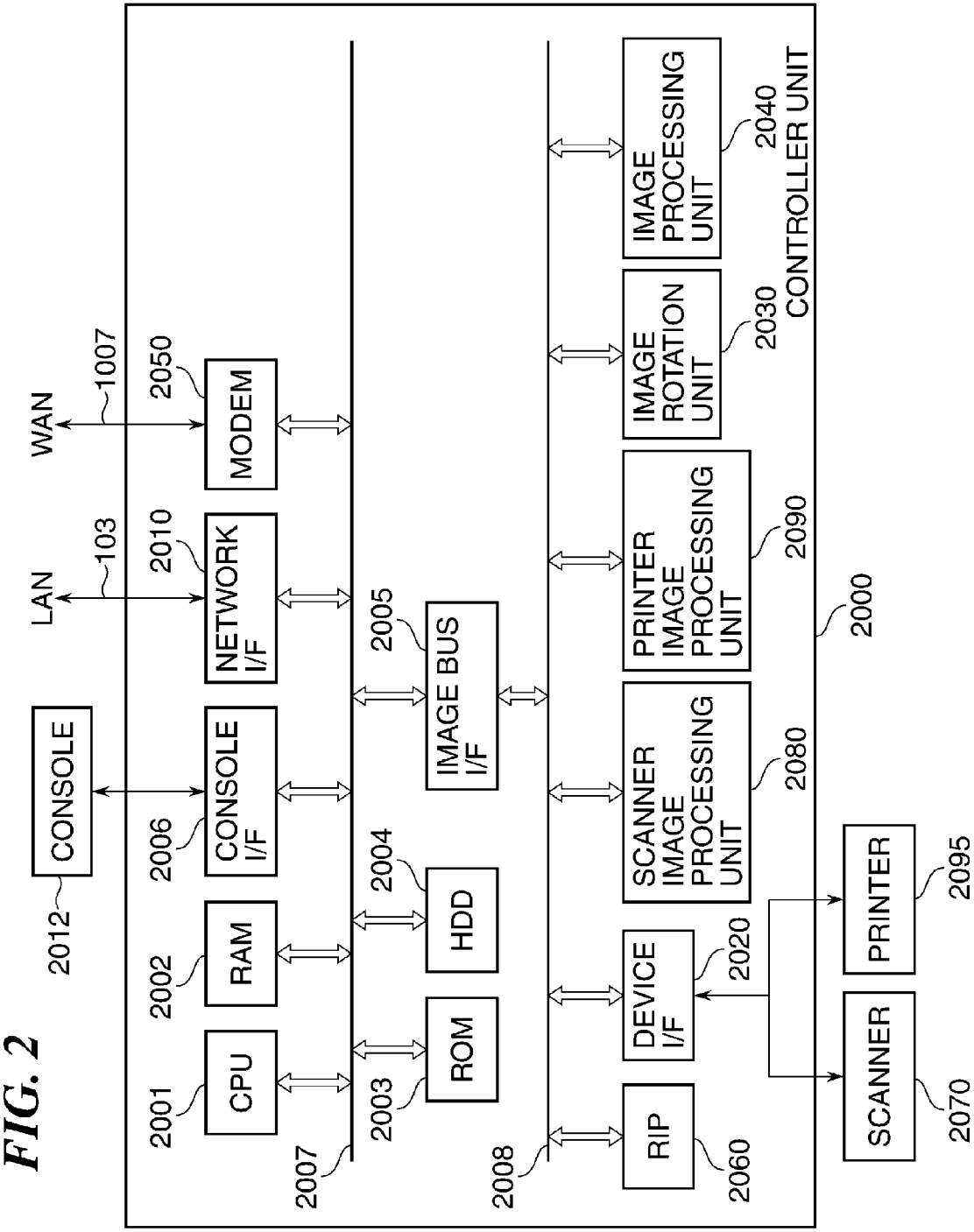
FIG. 2 is a block diagram schematically showing an exemplary arrangement of a controller unit in the MFP.

FIG. 2 is a block diagram schematically showing an exemplary arrangement of a controller unit in the MFP 101.

As shown in FIG. 2, the controller unit 2000 provides control so as to realize a function of causing a printer 2095 to print out image data scanned in by a scanner 2070. Also, by establishing connection with the LAN 103, the controller unit 2000 provides control so as to input and output image information and device information.

A CPU 2001 of the controller unit 2000 boots an OS with a boot program stored in a ROM 2003, and on the OS, executes application programs stored in an HDD 2004 to carry out various kinds of processing. A RAM 2002 is used as a work area for the CPU 2001 and as an image memory area for temporarily storing image data. The HDD 2004 stores application programs and image data.

A console I/F 2006, a network I/F 2010, a modem 2050, and an image bus I/F 2005 are connected to the CPU 2001 via a system bus 2007.

The console I/F 2006 is an interface to a console 2012 having a touch panel and others, and outputs image data, which is to be displayed on the console 2012, to the console 2012. The console I/F 2006 outputs information, which is input by a user via the console 2012, to the CPU 2001.

The network I/F 2010 inputs and outputs information to and from other apparatuses, which are connected to the LAN 103, via the LAN 103. The modem 2050 is connected to a public line, not shown, via a WAN 1007 to input and output information.

The image bus I/F 2005 is a bus bridge for connecting the system bus 2007 and an image bus 2008, which transfers image data at high speed, to each other, and converting data structures. The image bus 2008 is comprised of a PCI bus or IEEE 1394. A RIP (raster image processor) 2060, a device I/F 2020, a scanner image processing unit 2080, a printer image processing unit 2090, an image rotation unit 2030, and an image processing unit 2040 are connected to the image bus 2008.

The RIP 2060 is a processor which expands a PDL code into a bitmapped image. The scanner 2070 and the printer 2095 are connected to the device I/F 2020, and the device I/F 2020 carries out synchronous/asynchronous transformation of image data. The scanner image processing unit 2080 corrects, processes, and edits input image data.

The printer image processing unit 2090 carries out printer correction, resolution conversion, and so on with respect to printout image data. The image rotation unit 2030 rotates image data. The image processing unit 2040 compresses multivalued image data into JPEG data and compresses binary image data into JBIG data, MMR data, MH data, and so on, and expands them.

Figure 3:
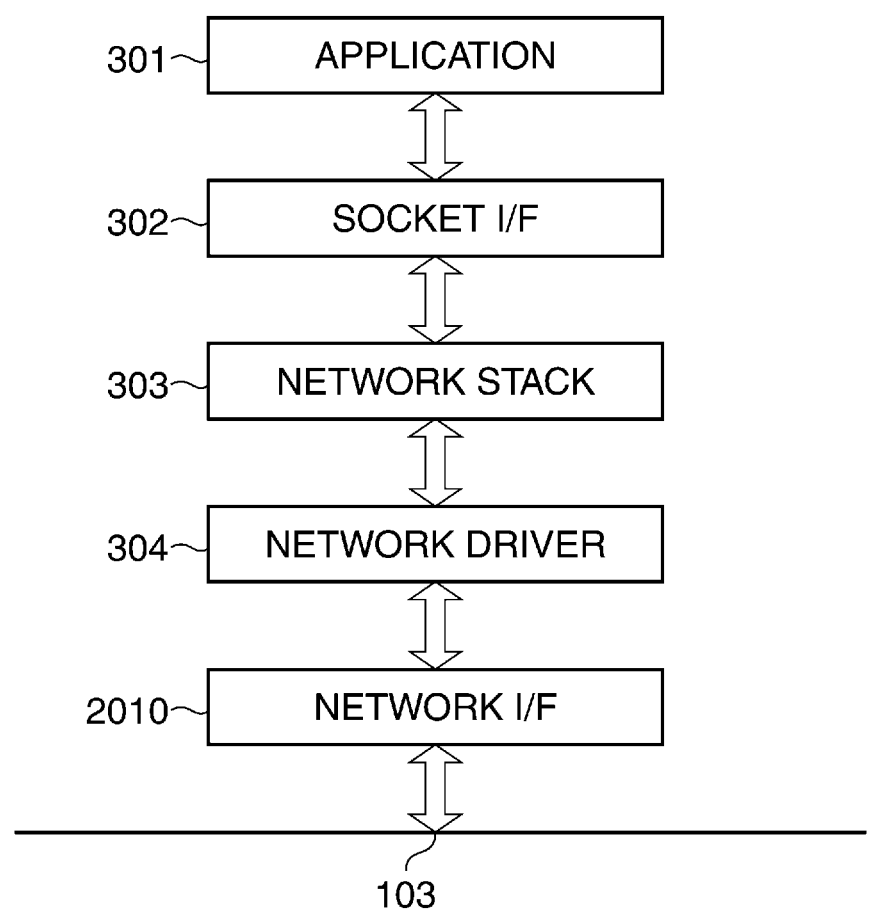
FIG. 3 is a diagram schematically showing an exemplary arrangement of essential parts of software relating to network communications carried out by the MFP.

FIG. 3 is a diagram schematically showing an exemplary arrangement of essential parts of software relating to network communications carried out by the MFP 101.

Referring to FIG. 3, an application 301 is a set of network applications operating on the MFP 101. A socket I/F 302 is a socket I/F program offered by the OS. When a network application included in the application 301 is to carry out communication, the socket I/F 302 is called to enable such processing as transmission and receipt of data.

A socket I/F is a program that is not always required when a network application carries out communication, but is able to reduce man-hours for application development because it can use universal program instructions and processing flows irrespective of OS type. Thus, a network application generally transmits and receives data by calling a socket I/F. A network stack 303 is a protocol stack group. A network driver 304 is a device driver for the network I/F 2010.

Figure 4:
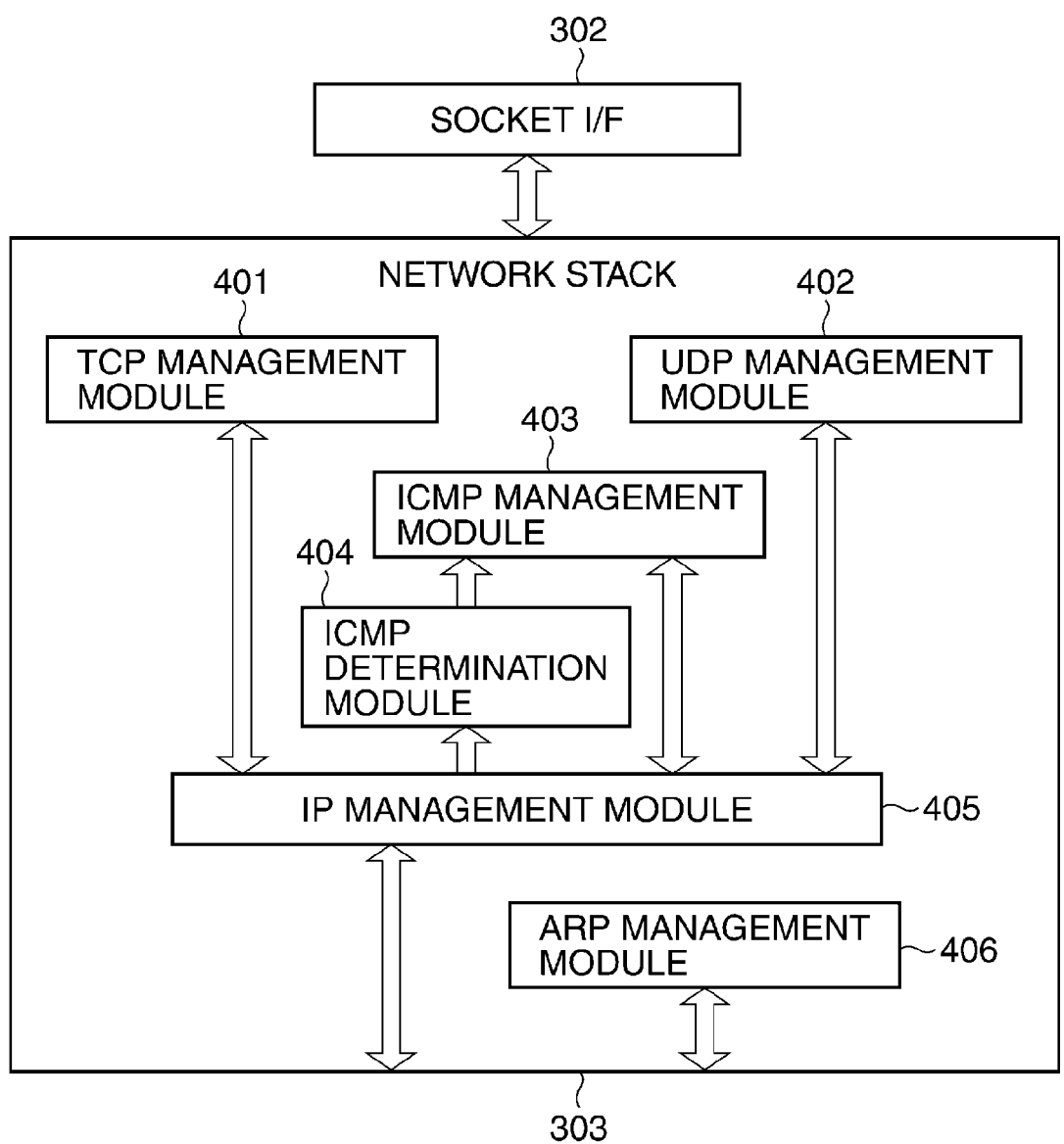
FIG. 4 is a block diagram schematically showing a specific exemplary module structure of a network stack.

FIG. 4 is a block diagram schematically showing an exemplary module structure of the network stack 303.

An ARP management module 406 is a software module that controls a protocol called ARP (address resolution protocol). An IP management module 405 is a software module that controls a protocol called IP (internet protocol).

A TCP management module 401 is a software module that controls a protocol called TCP (transmission control protocol). A UDP management module 402 is a software module that controls a protocol called UDP (user datagram protocol).

An ICMP management module 403 is a software module that controls a protocol called ICMP (internet control message protocol). The ICMP management module 403 receives an ICMP Echo Request packet via the network I/F 2010 through the IP management module 405 and an ICMP determination module 404.

Then, in response to the received ICMP Echo Request packet, the ICMP management module 403 provides transmission control to send back an ICMP Echo Reply packet.

The ICMP determination module 404 is a software module that provides control to analyze an ICMP packet received from the IP management module 405, and determines whether or not to pass the ICMP packet to the ICMP management module 403 according to determination conditions determined in advance.

Figure 5:
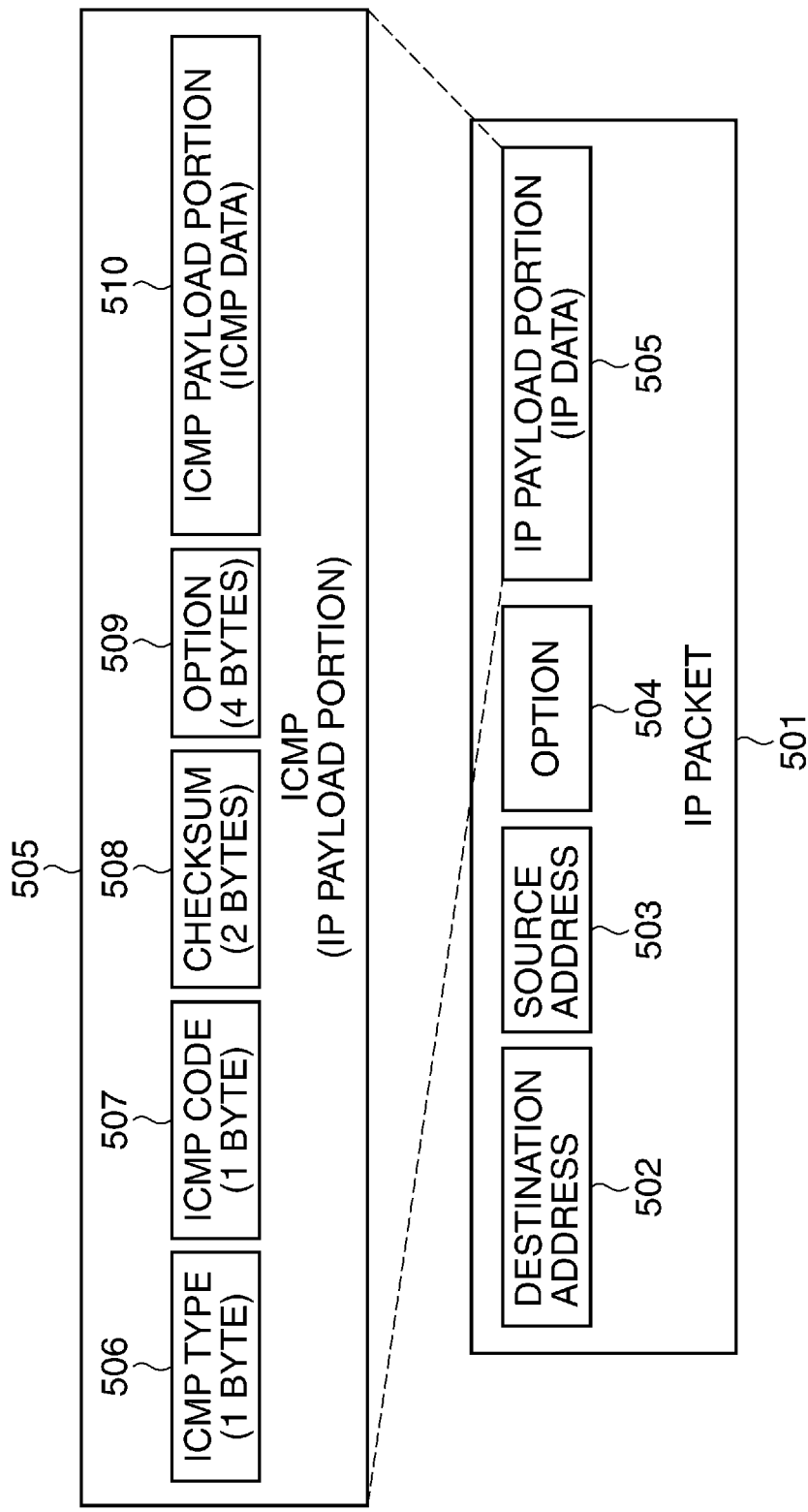
FIG. 5 is a diagram useful in outlining the format of an ICMP packet.

FIG. 5 is a diagram useful in outlining the format of an ICMP packet.

An ICMP packet is included in an IP packet 501, and data is stored in an ICMP format in an IP payload portion 505.

In the IP packet 501, a destination IP address is stored as a destination address 502, a source IP address is stored as a source address 503, and data on control of an IP packet is stored as an option 504.

The IP payload portion 505 is a data portion of an IP packet, in which data is stored in a format determined by each of protocols such as ICMP, TCP, and UDP.

ICMP Type 506 stores data indicative of an ICMP type and identifies whether or not an ICMP packet is ICMP Echo. In ICMP Code 507, Checksum 508, and Option 509, data determined in an ICMP format in advance is stored, although description thereof is omitted.

In the IP payload portion 505, data determined by ICMP Type 506 is stored, but in the case of an ICMP Echo packet, data stored in an ICMP payload portion 510 is not particularly determined.

Figure 6:
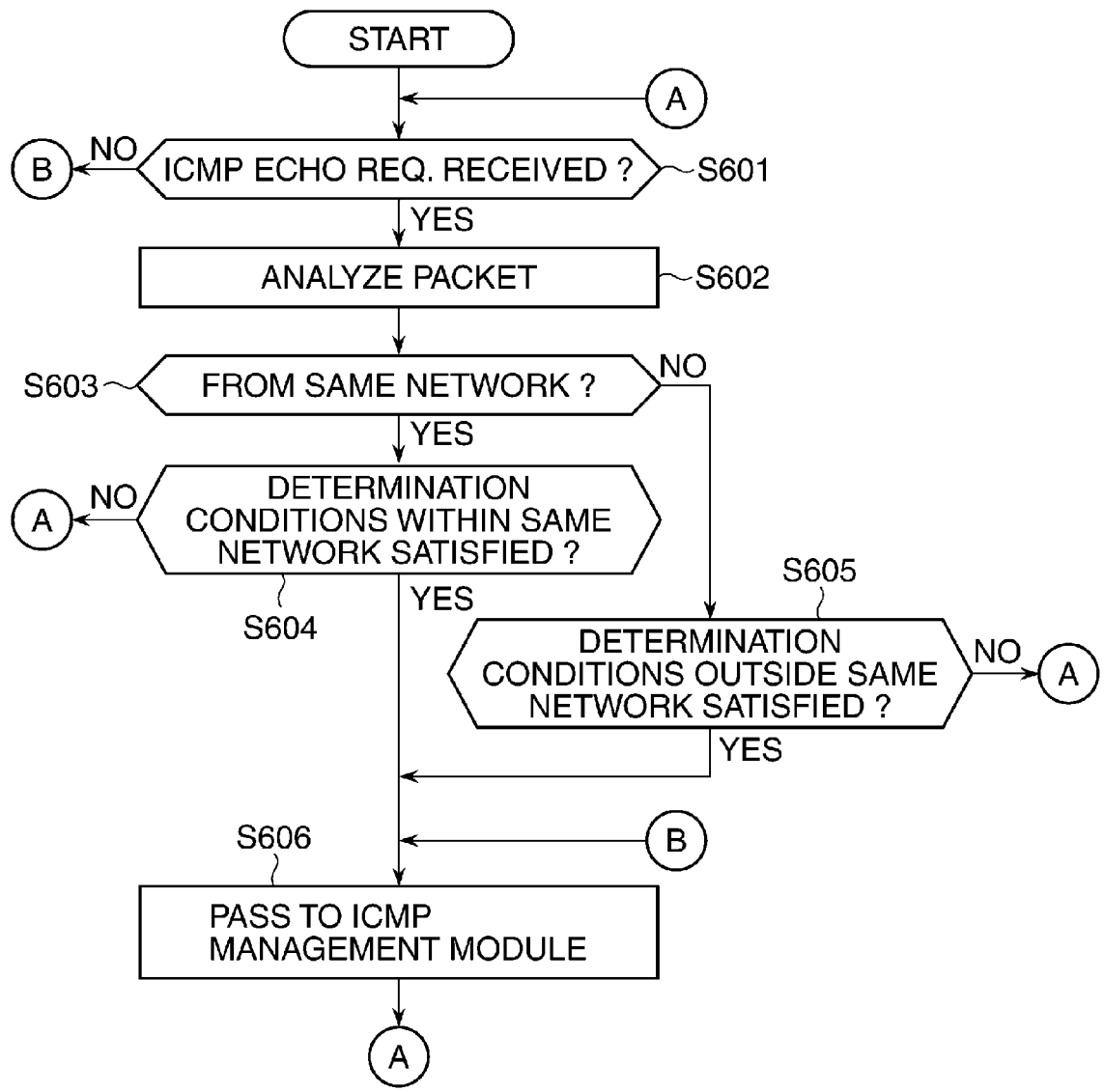
FIG. 6 is a flowchart useful in explaining an exemplary operation of an ICMP determination module in the MFP.
Figure 7:
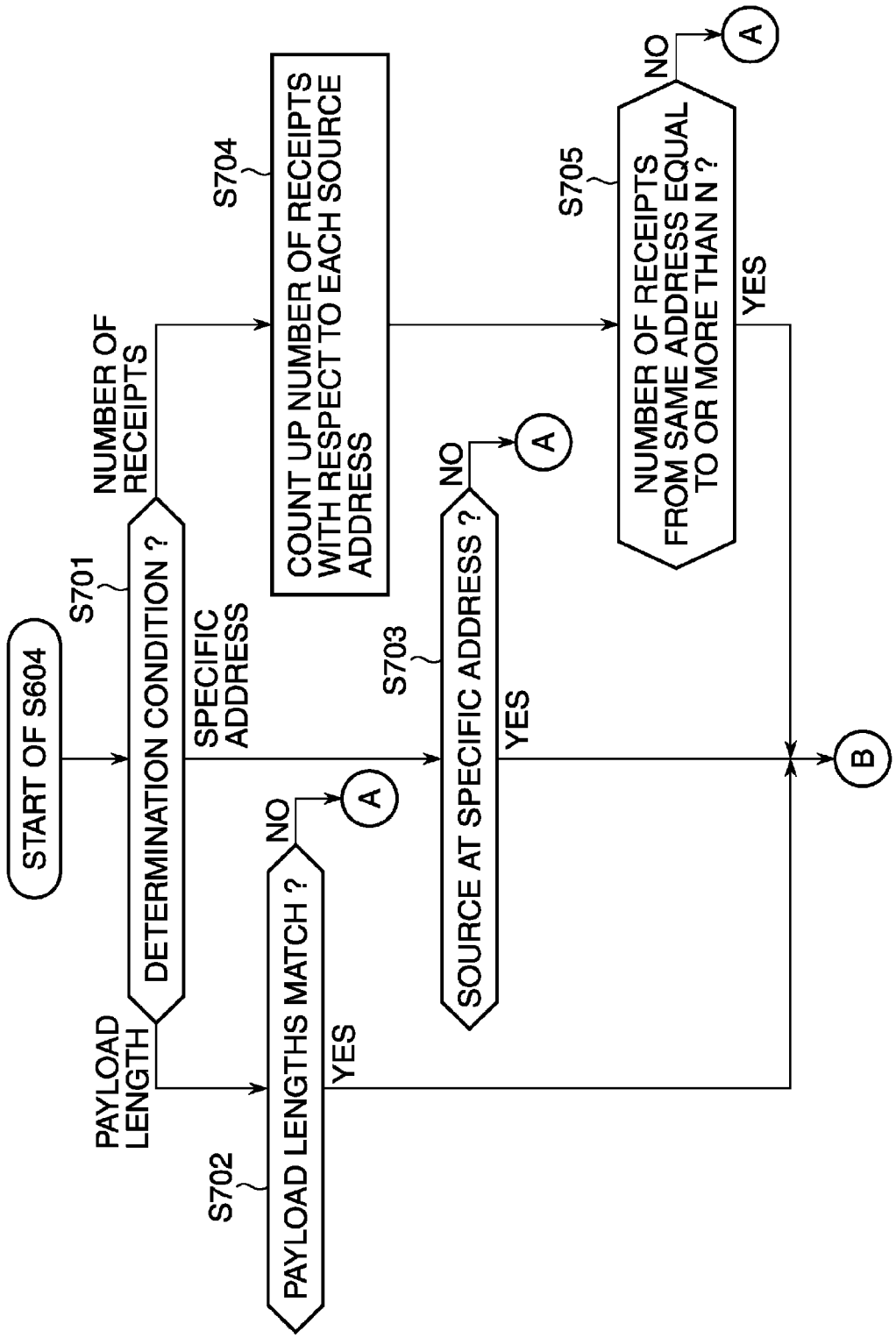
FIG. 7 is a flowchart useful in explaining a determination process in step S604 in FIG. 6.
Figure 8:
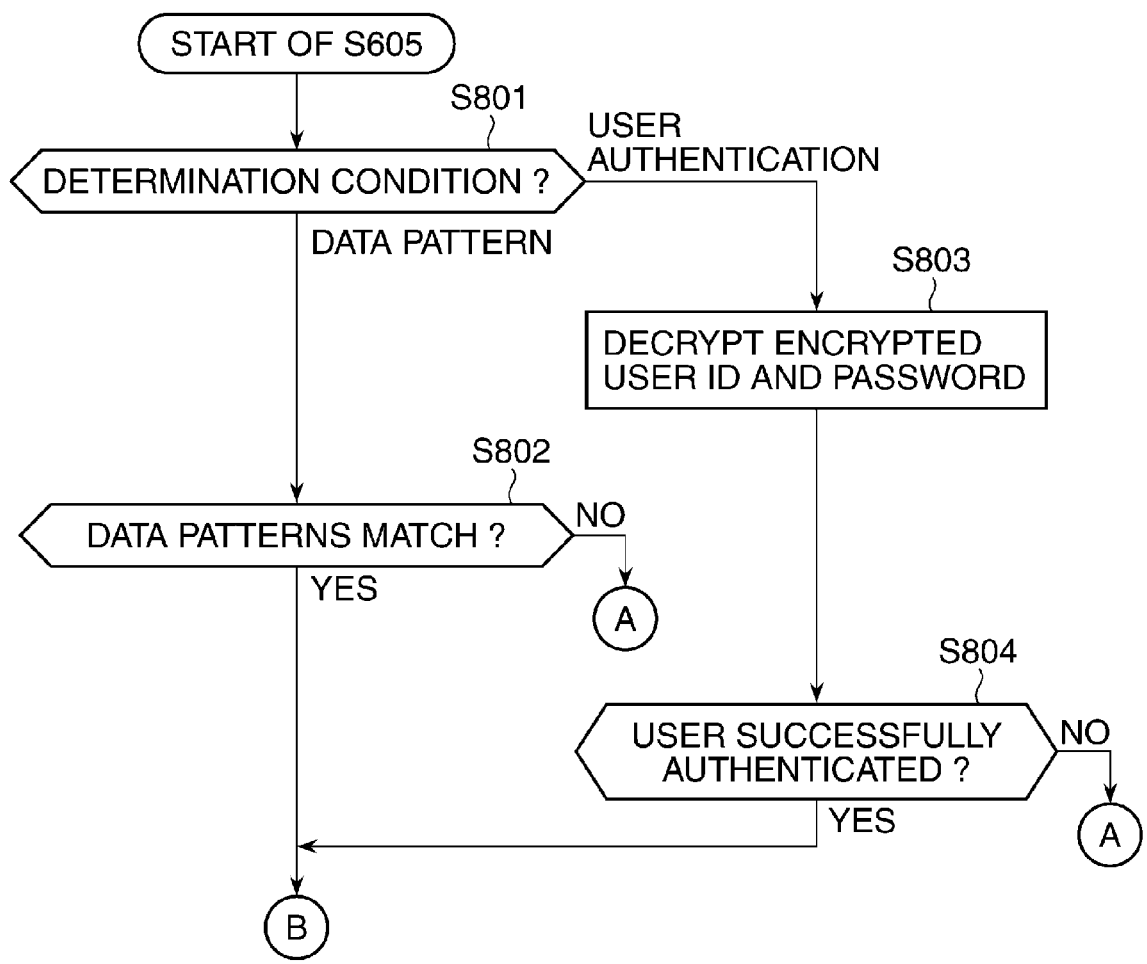
FIG. 8 is a flowchart useful in explaining a determination process in step S605 in FIG. 6.

Referring next to FIGS. 6 to 8, a description will be given of how the ICMP determination module 404 operates in the MFP 101 according to the present embodiment. Processes in FIGS. 6 to 8 are carried out by the CPU 2001 in accordance with programs stored in the HDD 2004 or the like of the MFP 101 and loaded into the RAM 2002.

First, when a network packet received by the IP management module 405 via the network I/F 2010 and the network driver 304 is an ICMP packet, the ICMP packet is passed to the ICMP determination module 404, and a process in step S601 in FIG. 6 is started.

Referring to FIG. 6, in the step S601, the CPU 2001 uses the ICMP determination module 404 to determine whether or not the received ICMP packet is an ICMP Echo Request packet.

Upon determining that the received ICMP packet is not an ICMP Echo Request packet, the CPU 2001 proceeds to step S606, and upon determining that the received ICMP packet is an ICMP Echo Request packet, the CPU 2001 proceeds to step S602.

In the step S606, the CPU 2001 passes the ICMP packet received in the step S601 to the ICMP management module 403, and returns to the step S601.

Here, the ICMP management module 403 provides transmission control defined by the ICMP protocol for the received ICMP packet. Namely, when the received ICMP packet is an ICMP Echo Request packet, the ICMP management module 403 provides transmission control to send back an ICMP Echo Reply packet. When the received ICMP packet is not an ICMP Echo Request packet, the ICMP management module 403 carries out processing suitable for the received ICMP packet.

In the step S602, the CPU 2001 analyzes data stored in the source address 503 and the ICMP payload portion 510 of the received ICMP Echo Request packet, and proceeds to step S603.

In the step S603, the CPU 2001 carries out a network determination process so as to determine whether or not the source address 503 is the same network address as that of the MFP 101.

Here, in a case where the ICMP Echo Request packet is transmitted from the PC 102, the source address 503 is 192.168.1.100. In this case, the CPU 2001 determines that the source address 503 is the same network address as that of the MFP 101, and proceeds to step S604. In a case where the ICMP Echo Request packet is transmitted from the PC 104, the source address 503 is 192.168.2.10. In this case, the CPU 2001 determines that the source address 503 is different from the network address of the MFP 101, and proceeds to step S605.

In the step S604, the CPU 2001 carries out a transmission determination process so as to determine whether or not the ICMP Echo Request packet matches a determination condition used in a case where the ICMP Echo Request packet is transmitted from the same network as that of the MFP 101.

Upon determining that the ICMP Echo Request packet matches the determination condition, the CPU 2001 proceeds to step S606, in which it carries out the same process as described above, and upon determining that the ICMP Echo Request packet does not match the determination condition, the CPU 2001 suspends the process on the ICMP packet and returns to the step S601. The details of the determination process carried out here will be described later with reference to FIG. 7.

On the other hand, in the step S605, the CPU 2001 carries out a transmission determination process so as to determine whether or not the ICMP Echo Request packet matches a determination condition used in a case where the ICMP Echo Request packet is transmitted from a network different from that of the MFP 101 (outside the same network).

Upon determining that the ICMP Echo Request packet matches the determination condition, the CPU 2001 proceeds to the step S606, in which it carries out the same process as described above, and upon determining that the ICMP Echo Request packet does not match the determination condition, the CPU 2001 suspends the processing on the ICMP packet and returns to the step S601. The details of the determination process carried out here will be described later with reference to FIG. 8.

Referring next to FIG. 7, a description will be given of the determination process in the step S604 in FIG. 6.

In step S701, the CPU 2001 determines what determination condition has been set by user's operation on the console 2012.

Specifically, when the determination condition is a data length of the ICMP payload portion 510, the CPU 2001 proceeds to step S702, when the determination condition is the source address 503, the CPU 2001 proceeds to step S703, and when the determination condition is the number of receipts, the CPU 2001 proceeds to step S704.

In the step S702, the CPU 2001 determines whether or not the data length of the ICMP payload portion 510 of the ICMP Echo Request packet matches a data length set by the user.

Then, upon determining that the data length of the ICMP payload portion 510 matches the data length set by the user, the CPU 2001 proceeds to the step S606, and upon determining that the data length of the ICMP payload portion 510 does not match the data length set by the user, the CPU 2001 returns to the step S601.

In the step S703, the CPU 2001 determines whether or not the source address 503 in the ICMP Echo Request packet matches an IP address set by the user.

Then, upon determining that the source address 503 matches the IP address set by the user, the CPU 2001 proceeds to the step S606, and upon determining that the source address 503 does not match the IP address set by the user, the CPU 2001 returns to the step S601.

In the step S704, the CPU 2001 counts up the number of times the ICMP Echo Request packet has been received with respect to each source address 503, and proceeds to step S705.

In the step S705, the CPU 2001 determines whether or not the number of times the ICMP Echo Request packet has been received is equal to or more than the number of times (N) set by the user.

Then, upon determining that the number of times the ICMP Echo Request packet has been received is equal to or more than the number of times (N) set by the user, the CPU 2001 proceeds to the step S606, and upon determining that the number of times the ICMP Echo Request packet has been received is less than the number of times (N) set by the user, the CPU 2001 returns to the step S601.

Referring next to FIG. 8, a description will be given of the determination process in the step S605 in FIG. 6.

In step S801, the CPU 2001 determines what determination condition has been set by user's operation on the console 2012.

Specifically, when the determination condition is a data pattern of the ICMP payload portion 510, the CPU 2001 proceeds to step S802, and when the determination condition is user authentication, the CPU 2001 proceeds to step S803.

In the step S802, the CPU 2001 determines whether or not data in the ICMP payload portion 510 of the ICMP Echo Request packet matches a data pattern set by the user.

Then, upon determining that data in the ICMP payload portion 510 matches the data pattern set by the user, the CPU 2001 proceeds to the step S606, and upon determining that data in the ICMP payload portion 510 does not match the data pattern set by the user, the CPU 2001 returns to the step S601.

In the step S803, the CPU 2001 decrypts encrypted user ID and password stored in the ICMP payload portion 510 of the ICMP Echo Request packet, and proceeds to step S804.

In the step S804, the CPU 2001 carries out user authentication using the user ID and the password decrypted in the step S803. When the user is successfully authenticated, the CPU 2001 proceeds to the step S606, and when the user is unsuccessfully authenticated, the CPU 2001 returns to the step S601.

FIG. 9 is a view showing an exemplary setting screen 901 displayed on the console 2012 of the MFP 101 so that the user can set determination conditions used in the step S701 in FIG. 7 and the step S801 in FIG. 8.

Referring to FIG. 9, ON 902 and OFF 903 are switches for selectively determining whether or not to send back an ICMP Echo Reply packet in response to a received ICMP Echo Request packet.

When ON 902 is selected, "Always Respond 905" or "Conditionally Respond 906" can be selected.

When "Always Respond 905" is selected, an ICMP Echo Reply packet is always sent back. When "Conditionally Respond 906" is selected, "Within Same Network 907" or "Outside Same Network 908" can be selected.

When "Within Same Network 907" is selected, a screen 909 is displayed on the console 2012. When "Outside Same Network 908" is selected, a screen 910 is displayed on the console 2012.

On the screen 909, one or more of "Payload Length 911", "Number of Receipts 912", and "Specific Address 913" can be selected as determination conditions within the same network.

When "Payload Length 911" is selected, a screen (not shown) for setting an arbitrary payload length is displayed. When "Number of Receipts 912" is selected, a screen (not shown) for setting the arbitrary number of receipts is displayed. When "Specific Address 913" is selected, a screen (not shown) for setting an arbitrary IP address is displayed.

Here, "Payload Length 911" corresponds to the determination condition in the step S702 in FIG. 7, "Number of Receipts 912" corresponds to the determination condition in the step S705 in FIG. 7, and "Specific Address 913" corresponds to the determination condition in the step S703 in FIG. 7. These determination conditions have lower security levels as compared to determination conditions outside the same network.

On the other hand, on the screen 910, one or both of "Data Pattern 914" and "User Authentication 915" can be selected as determination conditions outside the same network.

When "Data Pattern 914" is selected, a screen (not shown) for setting an arbitrary data pattern is displayed. When "User Authentication 915" is selected, a screen (not shown) for setting a user ID and a password of a user permitted to be authenticated is displayed.

Here, "Data Pattern 914" corresponds to the determination condition in the step S802 in FIG. 8, and "User Authentication 915" corresponds to the determination condition in the step S804 in FIG. 8. These determination conditions have higher security levels as compared to determination conditions inside the same network.

As described above, in the present embodiment, the user sets in advance determination conditions for judging whether or not to whether or not to send back an ICMP Echo Reply in response to a received ICMP Echo Request. Transmission is controlled so that when a received ICMP Echo Request satisfies the determination conditions, an ICMP Echo Reply is sent back, and when a received ICMP Echo Request does not satisfy the determination conditions, an ICMP Echo Reply is not sent back.

As a result, the presence of the MFP 101 cannot be confirmed for an ICMP Echo Request source that does not satisfy the determination conditions, and hence security can be improved. Moreover, communication status or the like can be checked for an ICMP Echo Request source that satisfies the determination conditions, and hence convenience in network communication using the ICMP Echo protocol can be ensured.

Moreover, in the present embodiment, conditions for determining whether or not to send back an ICMP Echo Reply differ according to whether an ICMP Echo Request source is an apparatus in the same network or outside the same network. Namely, when an ICMP Echo Request source is an apparatus in the same network, a relatively low security level is set for determination conditions, and when an ICMP Echo Request source is an apparatus outside the same network, a relatively high security level is set for determination conditions.

As a result, convenience in communication check or the like can be enhanced for apparatuses in the same network, and security can be further improved for apparatuses outside the same network.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-226722 filed Oct. 6, 2010, which is hereby incorporated by reference herein in its entirety.

What is claimed is:

1. A communication apparatus comprising:
   a receiving unit configured to receive a packet;
   a determination unit configured to determine whether a source of the packet received by said receiving unit is an apparatus lying in the same network as a network in which the communication apparatus lies;
   a judgment unit configured to, according to a result of the determination by said determination unit, judge whether to respond to the packet received by said receiving unit based on a first judgment condition in a case where it is determined that the source is the apparatus lying in the same network as the network in which the communication apparatus lies, and judge whether to respond to the packet received by said receiving unit based on a second judgment condition in a case where it is determined that the source is not the apparatus lying in the same network as the network in which the communication apparatus lies; and
   a response unit configured to, according to a result of the judgment by said judgment unit, respond to the packet received by said receiving unit.

2. The communication apparatus according to claim 1, further comprising:
   a setting unit configured to set the first judgment condition and the second judgment condition in accordance with an instruction from a user.

3. The communication apparatus according to claim 1, wherein the first judgment condition relates to at least one of the following: a payload length of the packet received by said receiving unit, a source address of the packet received by said receiving unit, and the number of receipts of the packet received by said receiving unit.

4. The communication apparatus according to claim 1, wherein the second judgment condition relates to at least one of the following: a data pattern of the packet received by said receiving unit, and authentication of user information included in the packet received by said receiving unit.

5. The communication apparatus according to claim 1, wherein the packet received by said receiving unit is an ICMP Echo packet.

6. A control method for a communication apparatus, comprising:
   a receiving step of receiving a packet;
   a determination step of determining whether a source of the packet received in said receiving step is an apparatus lying in the same network as a network in which the communication apparatus lies;
   a judgment step of, according to a result of the determination in said determination step, judging whether to respond to the packet received in said receiving step based on a first judgment condition in a case where it is determined that the source is the apparatus lying in the same network as the network in which the communication apparatus lies, and judge whether to respond to the packet received by said receiving step based on a second judgment condition in a case where it is determined that the source is not the apparatus lying in the same network as the network in which the communication apparatus lies; and
   a response step of, according to a result of the judgment in said judgment step, responding to the packet received in said receiving step.

7. A computer-readable non-transitory storage medium storing a program for implementing a control method for controlling a communication apparatus, the control method comprising:
   a receiving step of receiving a packet;
   a determination step of determining whether a source of the packet received in said receiving step is an apparatus lying in the same network as a network in which the communication apparatus lies;
   a judgment step of, according to a result of the determination in said determination step, judging whether to respond to the packet received in said receiving step based on a first judgment condition in a case where it is determined that the source is the apparatus lying in the same network as the network in which the communication apparatus lies, and judge whether to respond to the packet received by said receiving step based on a second judgment condition in a case where it is determined that the source is not the apparatus lying in the same network as the network in which the communication apparatus lies; and
   a response step of, according to a result of the judgment in said judgment step, responding to the packet received in said receiving step.

* * * * *